United States Patent
Zheng et al.

(10) Patent No.: US 11,070,266 B2
(45) Date of Patent: Jul. 20, 2021

(54) SYSTEMS AND METHODS OF ADAPTIVE BEAMFORMING FOR MOBILE SATELLITE SYSTEMS BASED ON USER LOCATIONS AND CO-CHANNEL WAVEFORMS

(71) Applicant: ATC Technologies, LLC, Reston, VA (US)

(72) Inventors: Dunmin Zheng, Vienna, VA (US); Santanu Dutta, Vienna, VA (US)

(73) Assignee: ATC Technologies, LLC, Reston, VA (US)

( * ) Notice: Subject to any disclaimer, the term of this patent is extended or adjusted under 35 U.S.C. 154(b) by 0 days.

(21) Appl. No.: 16/796,322

(22) Filed: Feb. 20, 2020

(65) Prior Publication Data
US 2020/0274594 A1     Aug. 27, 2020

Related U.S. Application Data

(60) Provisional application No. 62/808,698, filed on Feb. 21, 2019.

(51) Int. Cl.
| | | |
|---|---|---|
| *H04B 7/185* | (2006.01) | |
| *H04B 7/06* | (2006.01) | |
| *H04B 7/216* | (2006.01) | |
| *H04B 7/204* | (2006.01) | |

(52) U.S. Cl.
CPC ....... *H04B 7/0617* (2013.01); *H04B 7/18513* (2013.01); *H04B 7/18515* (2013.01); *H04B 7/18541* (2013.01); *H04B 7/2041* (2013.01); *H04B 7/216* (2013.01)

(58) Field of Classification Search
CPC .............. H04B 7/0617; H04B 7/18513; H04B 7/18515; H04B 7/18541; H04B 7/2041; H04B 7/216; H04B 7/185; H04B 7/18519; H04B 7/18539; H04B 7/18543; H04B 7/18558
USPC .............................. 455/12.1, 13.3, 427, 522
See application file for complete search history.

(56) References Cited

U.S. PATENT DOCUMENTS

| | | | |
|---|---|---|---|
| 2003/0083089 A1 | 5/2003 | Malladi | |
| 2005/0260947 A1* | 11/2005 | Karabinis | H04B 7/10 455/12.1 |
| 2008/0008264 A1 | 1/2008 | Zheng | |
| 2013/0252655 A1 | 9/2013 | Kim et al. | |
| 2018/0019800 A1 | 1/2018 | Buer et al. | |

OTHER PUBLICATIONS

PCT/US2020/019040 International Search Report and Written Opinion dated May 18, 2020 (21 pages).

* cited by examiner

*Primary Examiner* — Philip Sobutka
(74) *Attorney, Agent, or Firm* — Michael Best & Friedrich LLP

(57) ABSTRACT

Systems and methods for adaptive beamforming for a mobile satellite system (MSS). Embodiments described herein provide individual-user-optimized, adaptive beamforming. One example system creates a user beam optimized based either on known user locations or the waveforms received from all cochannel users. The user beam maximizes the signal-to-interference-noise relative to the desired user, both in the forward and return links. The optimization process considers the spatial distribution of all cochannel users in the footprint of the satellite. The user beam adapts to the user's location and co-channel interference environment.

58 Claims, 14 Drawing Sheets

| LINK DIRECTION | UE CHARACTERISTICS | USER BEAM VS FIXED SPOTBEAM (UNIFORM UE DISTRIBUTION) | USER BEAM VS FIXED SPOTBEAM (NON-UNIFORM UE DISTRIBUTION) |
|---|---|---|---|
| RETURN LINK | MIXED UE EIRP | 59.9% IMPROVEMENT OVER FIXED SPOT BEAM | 57.1% IMPROVEMENT OVER FIXED SPOT BEAM |
| FORWARD LINK | MIXED UE G/T | 66.6% IMPROVEMENT OVER FIXED SPOT BEAM | 55.3% IMPROVEMENT OVER FIXED SPOT BEAM |

FIG. 15

SYSTEMS AND METHODS OF ADAPTIVE BEAMFORMING FOR MOBILE SATELLITE SYSTEMS BASED ON USER LOCATIONS AND CO-CHANNEL WAVEFORMS

CROSS-REFERENCE TO RELATED APPLICATIONS

The present application is related to and claims benefit under 35 U.S.C. § 119(e) from U.S. Provisional Patent Application Ser. No. 62/808,698, filed Feb. 21, 2019, titled "Systems and Methods of Adaptive Beamforming for Mobile Satellite Systems Based on User Location/Waveform," the entire contents of which being incorporated herein by reference.

FIELD

Embodiments described herein relate to satellite and terrestrial wireless communications systems and, more particularly, to interference reduction through adaptive beamforming in satellite communications systems.

SUMMARY

Satellites used in modern mobile satellite systems (MSS), and terrestrial cellular base station antennas use multiple antenna feed elements to form a plurality of service areas (or cells). Conventional beamformers form fixed, regional spot beams for MSS, or sector beams for cellular systems. In general, spot beams and/or sector beams can increase the network capacity by enabling frequency reuse among the spot beams; the same applies to terrestrial sector beams. The regional spot beam or sector beam is usually shared by many users inside the beam, but users near the edge of the beam may have disadvantages such as gain and power degradation and adjacent cochannel beam interference. As the beam must cover many users, who may occupy a wide frequency band—the beam's bandwidth is made wide—even though each individual user may use a relatively narrowband subband. This unnecessarily compromises the beamformer's degrees of freedom to optimize the performance of each individual user. Besides, the fixed regional spot beam or sector beam is not adaptive to the users' individual operating conditions, such as: usage of power and bandwidth, and received interference power (intra-system and extra-system) as functions of time and user location. The above (and other) limitations of conventional beamforming systems are addressed in the present disclosure.

Examples of adaptive space-time signal processing comprising interference suppression and multi-user detection in a CDMA mobile satellite system environment are described in U.S. Pat. No. 7,813,700 B2 ("Adaptive beam forming with multi-user detection and interference reduction in satellite communication systems"). Embodiments presented herein provide systems and methods of adaptive beamforming, which involve more general waveforms, such as FDMA/TDMA/OFDMA, found in modern 4G/5G cellular systems. The systems and methods are applied to both the return and forward links.

Such embodiments are based on knowledge of the user's location. In one embodiment, this knowledge may be provided by the user equipment (UE), which may be equipped with a navigation subsystem, such as GPS, and thereby be aware of its own location. The user location information may be transferred from the UE to the S-BSS (Satellite Base Station Subsystem) by the air interface.

In another embodiment, applicable to the return link, the location of the user (which is the same as and, in this application, used interchangeably with UE location) may be estimated at the S-BSS from the spatial signature of return link transmissions and knowledge of the return signal waveform. Here, "spatial signature" refers to the distribution of the received power as a function of the Angle of Arrival (AoA) of the return link signal. In both embodiments, a customized, virtual beam is formed inside the S-BSS for each individual user, which maximizes the received signal-to-interference-and-noise power ratio for the particular user, considering the actual, spatial distribution of all cochannel users (i.e., the users sharing the same frequency in different beams). This customized virtual beam is referred to as a user beam, as mentioned above. The beam is referred to as "virtual" as it formed by signal processing software in the beamformer, although it performs exactly the same function as traditional, "real" beams formed by physical components such as phase shifters, amplifiers, and attenuators. Hereafter, the qualifier, "virtual," is dropped when referring to the beams of the present system.

The above-described principle may also be applied in the forward link as follows. An embodiment using frequency division duplexing (FDD) is described first. Given explicit knowledge of the UEs' locations at the S-BSS, which may be transported from the UEs to the S-BSS via the return link as indicated above, the S-BSS can form a user beam using knowledge of the RF calibration of the satellite's antenna subsystem, or feed elements. This calibration enables the S-BSS to determine the complex weights that should be applied to each feed element in order to achieve the objective spatial signature, or transmit gain pattern, necessary to form user beams for each UE. This transmit gain pattern would be optimized to jointly maximize the gain towards the targeted (i.e. desired) UE while minimizing the gains towards all UEs that are spatially well separated from the targeted UE and reusing the same frequency.

In another embodiment, time division duplexing (TDD) using a common return and forward link frequency may be used. In this embodiment, in addition to using explicit, a priori knowledge of the UE locations to generate the beamforming weights, the S-BSS may be able to substantially reuse the weights derived from return link optimization.

In addition to enabling optimization of the forward-downlink user beam, real time knowledge of the UE locations also enables the satellite's power to be dedicated exclusively to the active users—i.e., to direct power to geographic locations where it is needed. Many traditional MSS networks blanket the entire footprint of the satellite with uniform power, as the actual locations of the users are unknown, but they may appear unpredictably anywhere in the footprint. It has been found that, in most MSS networks, the service demand density is highly non-uniform over the footprint of the satellite. This leads to considerable waste of satellite power when it is distributed uniformly over geography. It is noteworthy that downlink power and bandwidth are key, finite resources in an MSS network.

The following discussion applies to both the forward and return links. The adaptive user beam is formed with a bandwidth that corresponds to the user's signal bandwidth (BW), also referred to as the nominal channel bandwidth. This bandwidth may vary between the users. Matching beamforming BW to the user's signal BW maximizes the beamformer's degrees of freedom to optimize the performance of each individual user. The user beam pattern is adaptive to the user's location and the cochannel interference environment. Note that, unlike an RF or IF implementation, which is common in many traditional systems, beamforming with the user's signal bandwidth is relatively easy to implement when performed as a part of the received signal demodulation process, as it is in the embodiments presented herein.

The reason for the above simplification is as follows. When a user's channel bandwidth is sufficiently small that the differential frequency responses of the feed element paths over the said bandwidth is flat, i.e. the gains and phase shifts are frequency independent, the beamforming can be classified as "narrowband". Narrowband beamforming can be performed with relatively simple, frequency independent, scalar multipliers; in contrast, wideband beamforming requires frequency dependent, vector multipliers, i.e. transversal filters. Alternatively, the feed element paths may first have their frequency responses equalized over the beam's bandwidth, after which scalar multipliers can be used. Either approach imposes a substantial burden on traditional satellite networks, especially for ground based beamforming (GBBF), compared to the requirements of the present system.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 15 is a chart illustrating performance improvements of a user beam system over a conventional fixed spot beam system according to some embodiments.

Figure 1A:
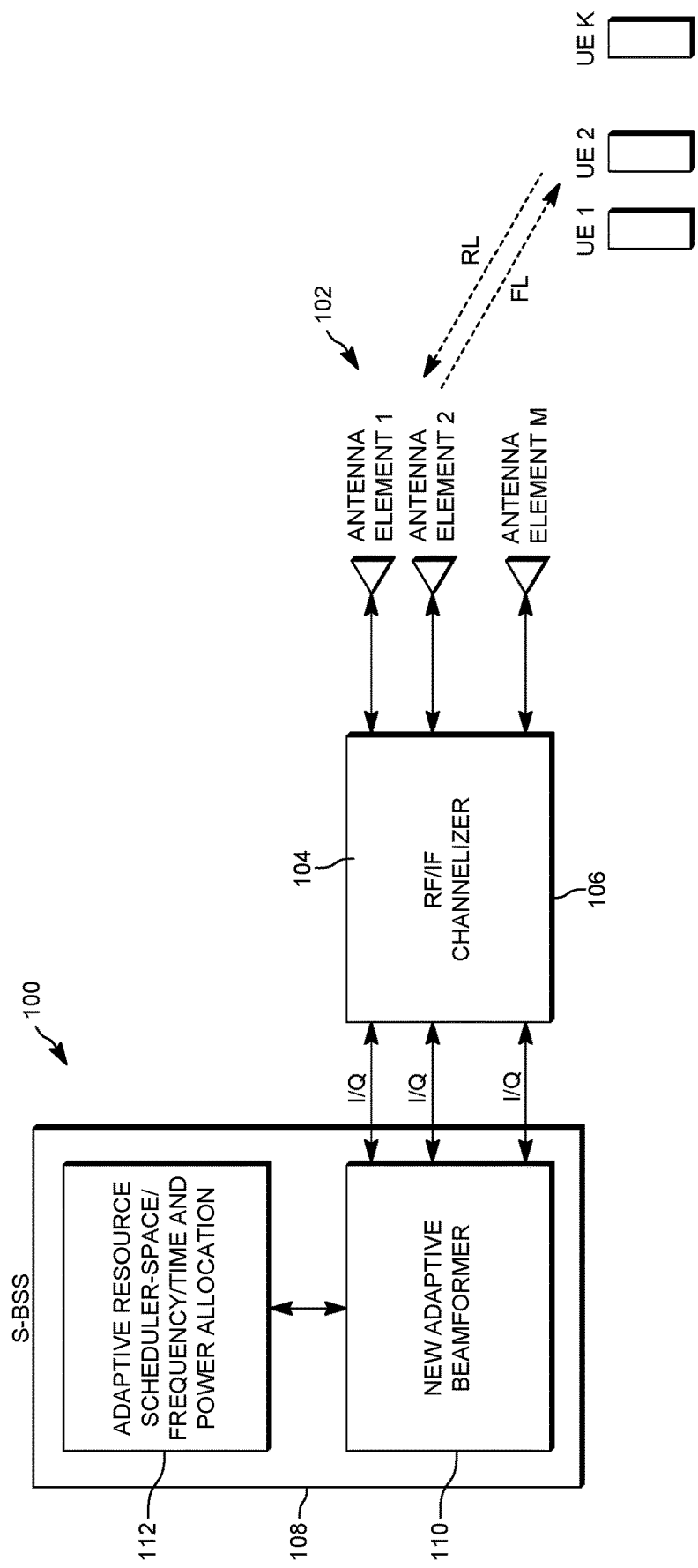
FIG. 1A is a diagram of an adaptive beamforming system according to some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Before any embodiments are explained in detail, it is to be understood that the disclosure is not limited in its application to the details of construction and the arrangement of components set forth in the following description or illustrated in the following drawings. The disclosure is capable of other embodiments and of being practiced or of being carried out in various ways.

It should also be noted that a plurality of hardware and software based devices, as well as a plurality of different structural components may be used to implement aspects of the disclosure. In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronics-based aspects may be implemented in software (e.g., stored on non-transitory computer-readable medium) executable by one or more electronic processors (for example, microprocessors). As such, it should be noted that a plurality of hardware and software based devices, as well as a plurality of different structural components may be utilized to implement the disclosure. For example, "control units" and "controllers" described in the specification can include one or more processors, one or more memory modules including non-transitory computer-readable medium, one or more input/output interfaces, and various connections (e.g., a system bus) connecting the components.

For ease of description, the example systems or devices presented herein may be illustrated with a single exemplar of each of its component parts. Some examples may not describe or illustrate all components of the systems. Other example embodiments may include more or fewer of each of the illustrated components, may combine some components, or may include additional or alternative components.

Embodiments described herein provide individual-user-optimized, adaptive beamforming for mobile satellite systems. One example system creates a 'beam for each user', referred to as 'user beam' (that is, for communication with user equipment participating in the mobile satellite system). As used herein, the term "user equipment" or "UE" includes satellite radiotelephones or data terminals, including smart telephones and access points for internet of things (IoT), wherein the terminal includes a radio frequency transceiver and may also include a global positioning system (GPS) or global navigation satellite system (GNSS) receiver. The user beam is optimized based either on known user locations or the attributes, or signatures, of waveforms received from all cochannel users. The system operates in an environment of significant frequency reuse among the cochannel users. Knowledge of user locations is transferred to the S-BSS (Satellite Base Station Subsystem) by the return link or is derived at the S-BSS from estimation of the spatial signature of the return link signals with knowledge of pilot signals in the return link waveform. The user beam maximizes the signal-to-interference-noise relative to the desired user, both in the forward and return links. The optimization process considers the spatial distribution of all cochannel users in the footprint of the satellite. The user beam adapts to the user's location and co-channel interference environment. By simulation, the performance of the beamforming system is compared with an existing fixed beamforming system, represented by a major GEO MSS covering the Continental United States and Canada. The simulation results show that user-optimized adaptive beamforming offers significant capacity advantages over the legacy beamforming, measured by aggregate system throughput.

1. New User Beamforming System and Adaptive Resource Scheduler

FIG. 1A illustrates a high-level block diagram of an adaptive beamforming system 100. The described methods may be applied to both cellular networks and MSS, although the present narrative treats the latter as the preferred embodiment for the purpose of explaining the concepts. Within the MSS category are included both on-board beamforming, wherein the beams are formed on the satellite, and ground based beamforming (GBBF), where the beams are formed by subsystems of a satellite earth station, or gateway. The system block diagram of FIG. 1A applies, in a general way, to all the above embodiments.

The following are the major elements, or subsystems, of the beamformer system 100.

Antenna array 102: A fundamental component in a beamformer is an array of multiple antennas. The antennas and their feeder electronics (which feed radio signals to and from the antenna elements) are often referred to as feed elements.

Channelizer 104: This subsystem subdivides a broad operating RF band, for example, the MSS L-band, into sub-bands that may be more suitable as operating channel bandwidths, transmit power amplifiers, and receive low noise amplifiers. Channelizers are more common in satellite systems and may not be necessary in cellular systems operating with lower RF bandwidths relative to the operating frequency.

RF/IF 106: This represents analog electronics that may exist between the antenna array and the Satellite Base Station Subsystem (S-BSS). These electronics may be distributed between the satellite and the ground based gateway in satellite embodiments, or the tower head and radio access network (RAN) equipment in terrestrial cellular embodiments.

Satellite Base Station Subsystem (S-BSS) 108: This performs the RAN functions of resource scheduling and data/signal processing required by the lower layers of the protocol stack. The following explains some differences between how beamforming is performed in existing systems and how it is performed in the embodiments discussed herein.

Traditional beamforming architecture: For transmit operation, a data stream from an upper layer of the communication protocol stack is converted into a single stream of transmit symbols. These symbols are fed to a beamformer, which may be analog or digital in implementation. The beamformer converts the single stream into M symbol streams with appropriate relative amplitudes and phases. The said M streams are then fed to an M-element antenna array. For receive operation, the traditional beamformer linearly combines the M received symbol streams into a single stream. The combining process applies appropriate amplitude weights and phase shifts to each stream. The said single stream is then provided to the S-BSS for receive-mode signal/data processing corresponding to the lower layers of the communications protocol stack. The above operation is performed for every beam of the network.

New Adaptive Beamformer 110: M symbol streams are passed transparently (i.e., preserving the relative amplitudes and phases of the streams, and with minimal signal distortion) to the S-BSS, as shown in FIG. 1A. The example system illustrated in FIG. 1A includes an I/Q (in-phase and quadrature) interface for use with signals' center frequencies, which are at complex baseband. However, a bandpass IF interface may also be used without departing from the teachings of the present disclosure.

Receive Mode Operation: In the receive mode of operation, the S-BSS receives an M-element symbol stream (i.e. a stream of complex vectors), instead of a single (i.e. scalar) symbol stream. The linear signal processing methods described here may be used to adaptively combine the M-streams into a single stream with an improved signal-to-interference-plus-noise ratio (SINR). However, because the new architecture makes available to the S-BSS a vector of received symbols, as opposed to a post-beamformed scalar stream, which would be provided if traditional beamforming had been used, the S-BSS is able to apply powerful techniques using vector inputs, including non-linear techniques, to demodulate the symbols with greater reliability. Examples of non-linear techniques are Decision Feedback and Multiuser Detection.

Transmit Mode Operation: In the transmit mode, the S-BSS performs the function of the beamformer by producing a vector stream instead of scalar stream. The transmit vector incorporates the appropriate relative amplitude weights and phase shifts necessary to create the desired beams.

The Receive and Transmit mode beamforming operations described above are performed individually for each UE; hence the beam pattern is customized to the requirements and operating environment of each UE. It may be noted that, in traditional beamforming, it is one beam for many UEs; all UEs in a beam share the spatial attributes of that beam.

Adaptive Resource Scheduler (ARS) 112: A RAN resource scheduler is a common subsystem in existing S-BSS's but is usually very loosely coupled to the RAN. In other words, it is typically not responsive to the radio frequency characteristics of the signals received by the RAN. In the new architecture, the resource scheduler is tightly coupled to the RAN, i.e., it is an essential contributor to the adaptivity of the beamforming system. For example, the adaptive resource scheduler (ARS) determines an optimal frequency, time and power allocation for each individual user dynamically, based on the spatial distribution of all active users and their demands, which may be driven by traffic loads and Quality of Service (QOS) requirements.

Figure 1B:
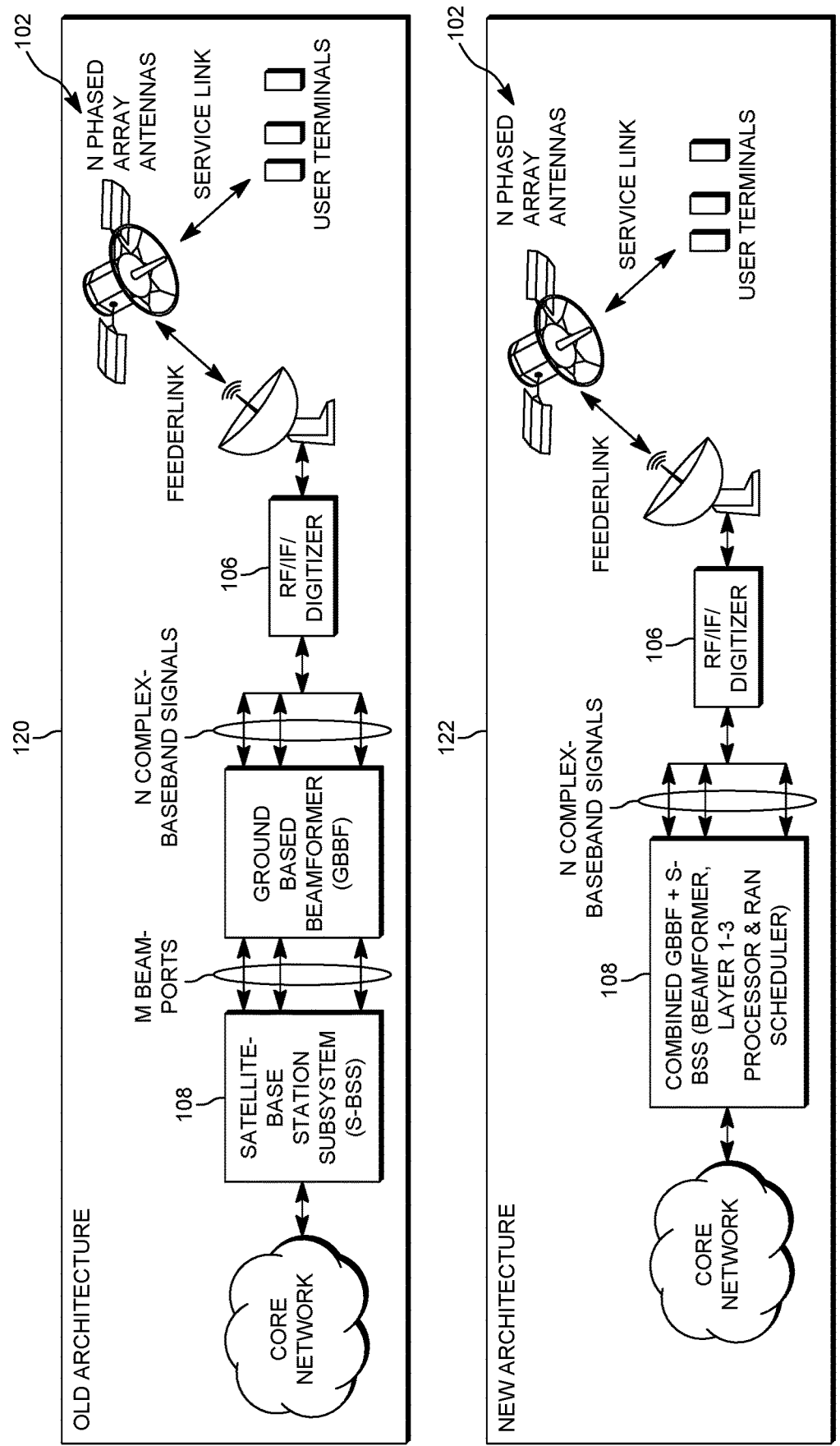
FIG. 1B illustrates ground-based beamforming systems according to some embodiments.

FIG. 1B is a block diagram of a system where the beamformer is located on the ground, which is the architecture (including both old and new embodiments) corresponding to a ground-based beamformer (GBBF). In the old GBBF architecture 120, the beamformer is separate from the Satellite Base Station Subsystem (S-BSS) 108, as is the current practice, whereas in the new GBBF architecture 122, the beamforming is integrated in the S-BSS 108.

Figure 14:
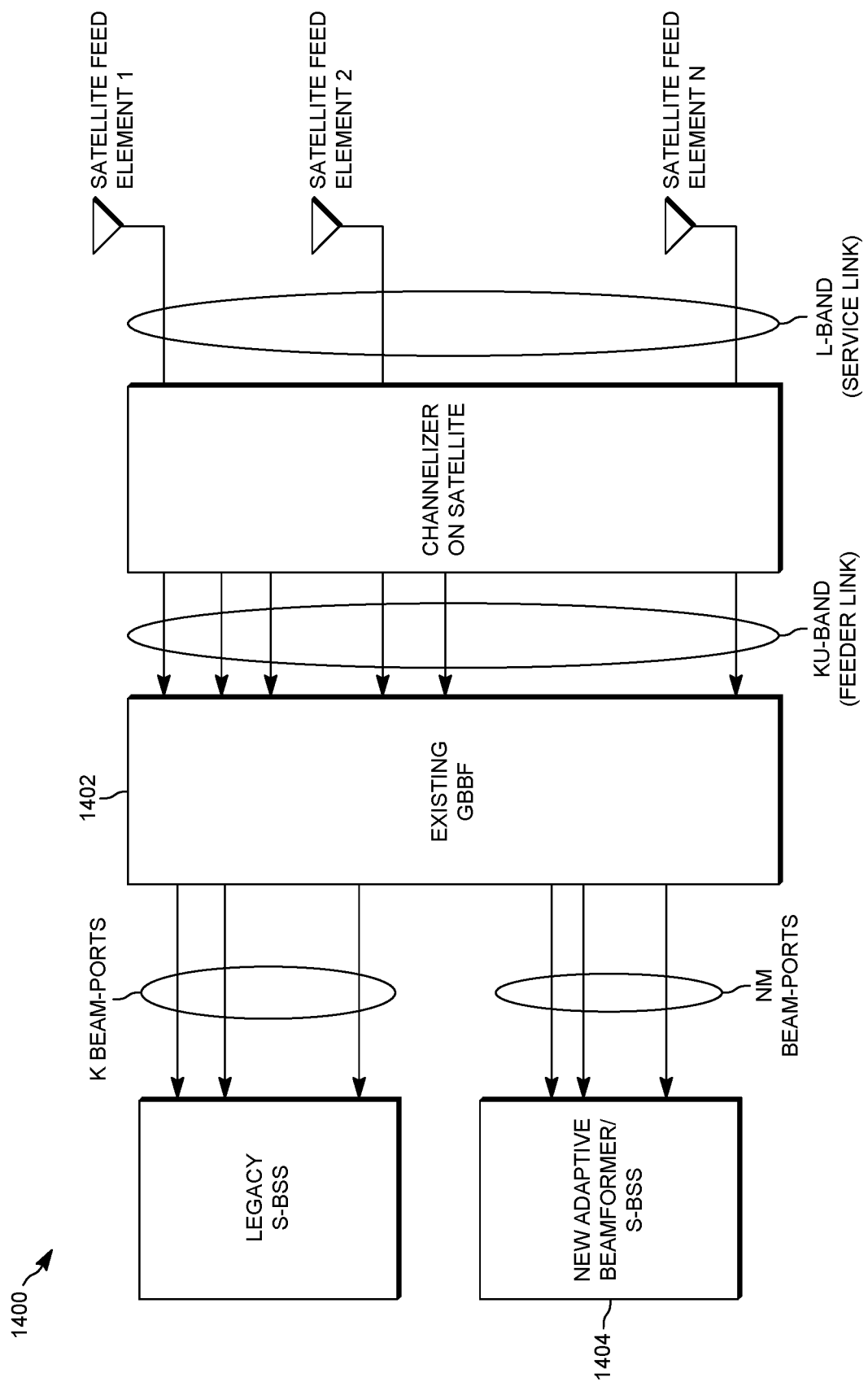
FIG. 14 illustrates an adaptive beamforming system according to some embodiments.

FIG. 14 illustrates an example beamforming system 1400 whereby an existing, separately beamforming GBBF 1402, depicted in the old architecture of FIG. 1A, can be logically bypassed in order to connect the feed element signals directly to the S-BSS. The new adaptive beamformer 1404 may be added to the existing GBBF as additional capability, while preserving the existing GBBF's traditional ability to form beams before the signals are fed to the S-BSS. Note that, in the new adaptive beamformer, the S-BSS includes the beamforming functionality, as in current terrestrial 3GPP systems. According to the new architecture, the existing GBBF's weights are designed to transparently connect the feed element signals to the S-BSS inputs—one feed element to one input. These GBBF weights comprise complex vectors where one element is set to unity (i.e., 1+j0) and all other elements are set to zero; the weight element set to unity depends on the particular feed element that is connected to the S-BSS. The advantage of this architecture is that existing S-BSS units can continue to be served by the existing GBBF operating in its traditional modes, while the new S-BSS can access the feed elements through the existing GBBF operating in the pass-through mode. This architecture can be applied to both return link beamforming and forward link beamforming.

The motivation for the bypassing of the existing GBBF, described above, may be a commercially desire to preserve the present functions of a legacy GBBF with minimal disruption, while adding the methods of the present disclosure as added beamforming options and implementing them externally (relative to the existing GBBF) in the S-BSS. It should be obvious that, in an alternative embodiment, especially in a new implementation, the new methods may also be implemented in a standalone GBBF, with the S-BSS performing its traditional, exclusively RAN functions. The motivation for this architectural choice may be commercial rather than technical. Because of the close coupling between elements of the RAN processing, such as the Adaptive RAN Scheduler, and beamforming, the technically optimum architecture appears to be a joint RAN Processor and Beamformer, shown as S-BSS in FIG. 14, wherein the separate GBBF is either eliminated or bypassed, and the feed element signals are connected directly to the S-BSS.

Figure 2:
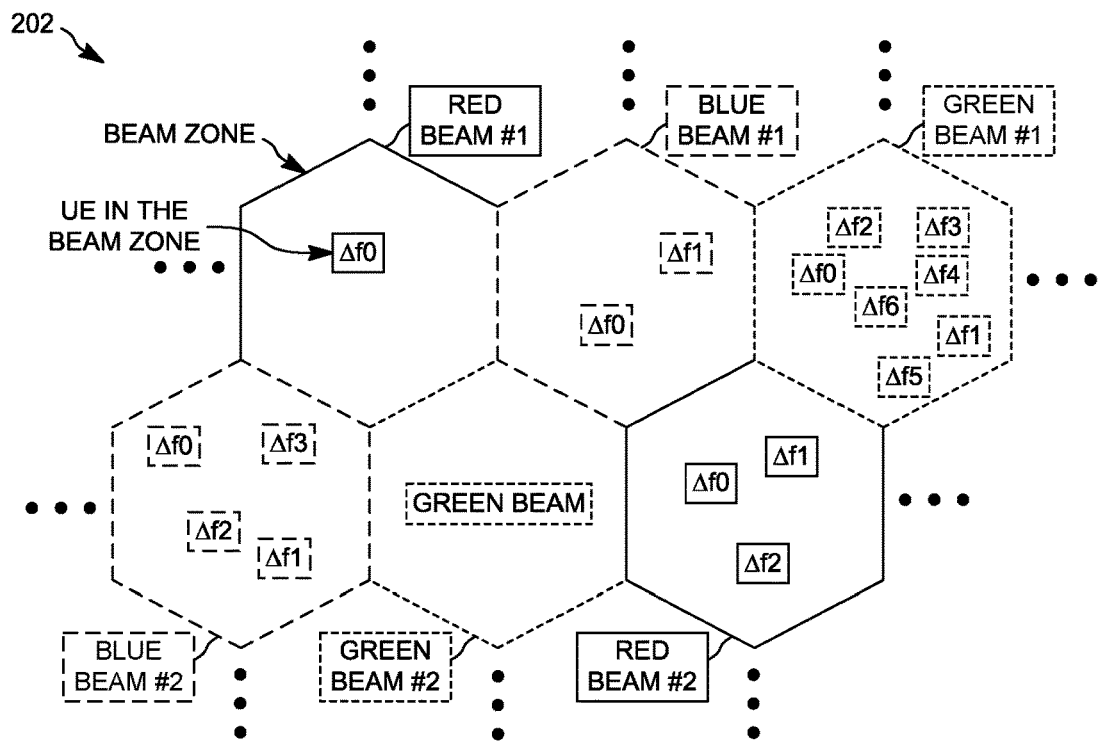
FIG. 2 illustrates a plurality of spot beam zones.
Figure 3:
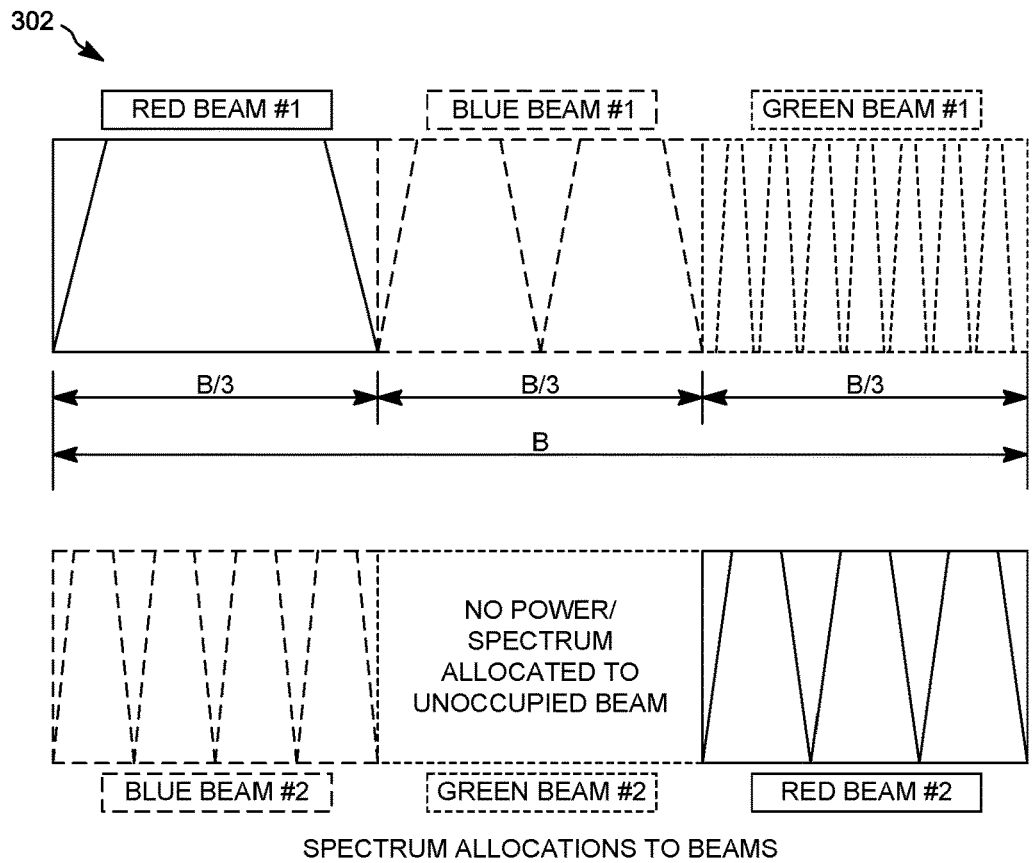
FIG. 3 illustrates aspects of the operation of the adaptive beamforming system of FIG. 1 according to some embodiments.

A new concept, the "beam zone," distinct from operational spotbeams, is introduced in the new system. Beam zones are traditional, fixed (non-adaptive) spotbeams with an N-color reuse. For example, FIG. 2 illustrates a plurality of beam zones 202 with the case of N=3 shown as an example, although N may have any value. The beam zones 202 are used for frequency planning—they do not represent operational beams. FIG. 3 illustrates how the frequency and power allocation are performed by the system 100. Assume that a channel bandwidth, B, is available for the new system and, to enable 3-color frequency reuse, the band is divided into 3 segments, each having a bandwidth of B/3. Each beam zone is allocated spectrum corresponding to one of the 3-color segments. Users located in a common beam-zone would share the same B/3 spectrum through a multiplexing scheme such as frequency division multiplexing (FDM). Other multiplexing schemes for sharing a band among multiple users could equally be used—the use of FDM in the present disclosure should be seen as exemplary rather than essential to the core teachings about beamforming. For example, orthogonal frequency division multiplexing, time division multiplexing, and code division multiplexing may be used. Note that, typically, the beam zones may be too small to allow separation of the users' signals via beamforming, i.e., spatial multiplexing. This is owing to the limited aperture of the satellite's antenna array. As in traditional, fixed beam design, the beam zones are designed such that cochannel users in adjacent beam-zones have a minimum spatial isolation. Typically, the fixed beam design would incorporate pattern nulls at a number of control points in the adjacent cochannel beams.

An example frequency allocation scheme 302 is illustrated in the FIG. 3. As an example of using FDM for K users inside a beam-zone, the frequency bandwidth B/3 would be equally divided among the users with each having B/(3*K)—unequal distributions of bandwidth to users could also be used without departing from the present teachings. This implies that if there were fewer users inside the beam-zone, the user(s) could occupy more bandwidth than if there were more users inside the same beam. The additional bandwidth might be used to provide more throughput to the users to improve their Quality of Service (QOS) or, alternatively, enable the users to spread their spectrum beyond the minimum required for a targeted QOS, thereby using spread spectrum processing gain to reduce the interference to other cochannel users. As user locations and distributions change over the time, the frequency allocation dynamically adapts to the user situation accordingly.

Figure 4:
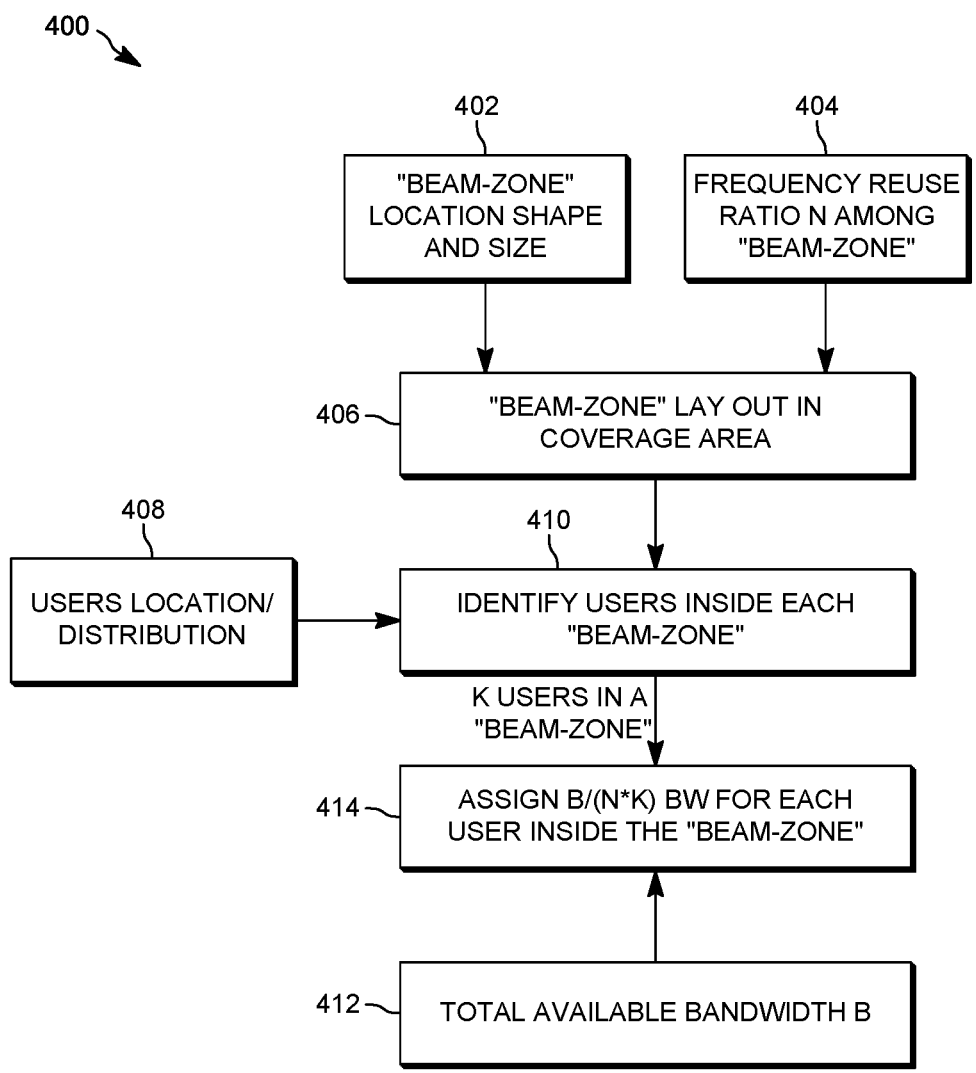
FIG. 4 is a flow diagram of a resource allocation procedure, according to some embodiments.

An example resource allocation procedure 400 is summarized in the flowchart shown in FIG. 4. It starts with the input definition of "beam-zone" location, shape and size (at block 402), and frequency reuse ratio N among those "beam-zones" (at block 404), which determines the "beam-zone" layout in coverage area (at block 406). Then, based on the users' location and distribution (at block 408), the scheduler identifies users inside each "beam-zone" (at block 410). Assuming that the total available bandwidth is B (at block 412) and that there are K users in a "beam-zone," the scheduler assigns B/(N*K) BW for each user inside the "beam-zone" (at block 414).

In some embodiments, the users inside a "beam-zone" may use all the B/N frequency bandwidth through TDMA by allocating an exclusive time slot for each of the users. In some embodiments, the users may share the B/N frequency bandwidth through combination of FDM/TDM such as in OFDMA system. In some embodiments, the users may share the B/N frequency bandwidth through CDMA, noting that if CDMA were used, a frequency reuse corresponding to N=1 may be feasible.

In distribution of the total EIRP in the forward link, in some embodiments, the adaptive resource scheduler may uniformly distribute transmit power among all active users. This means that satellite power is distributed proportionally to users' geographic density.

Considering the return link, in some embodiments, different users may be allocated different amounts of transmit power, proportional to their QOS needs, which may be established by a QOS negotiation with an entity in the network infrastructure (S-BSS or other entity). The unequal distribution allows different UE types to be supported in the same beam-zone.

Figure 5:
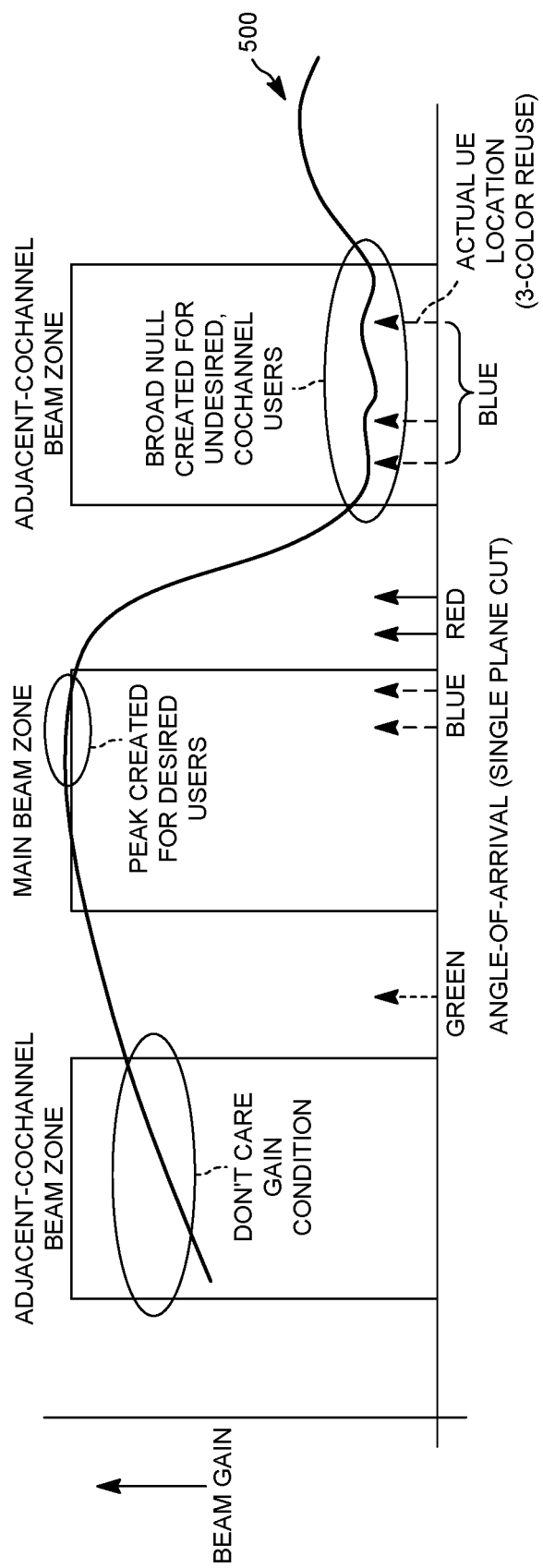
FIG. 5 illustrates an example of how a user beam is formed according to some embodiments.
Figure 6:
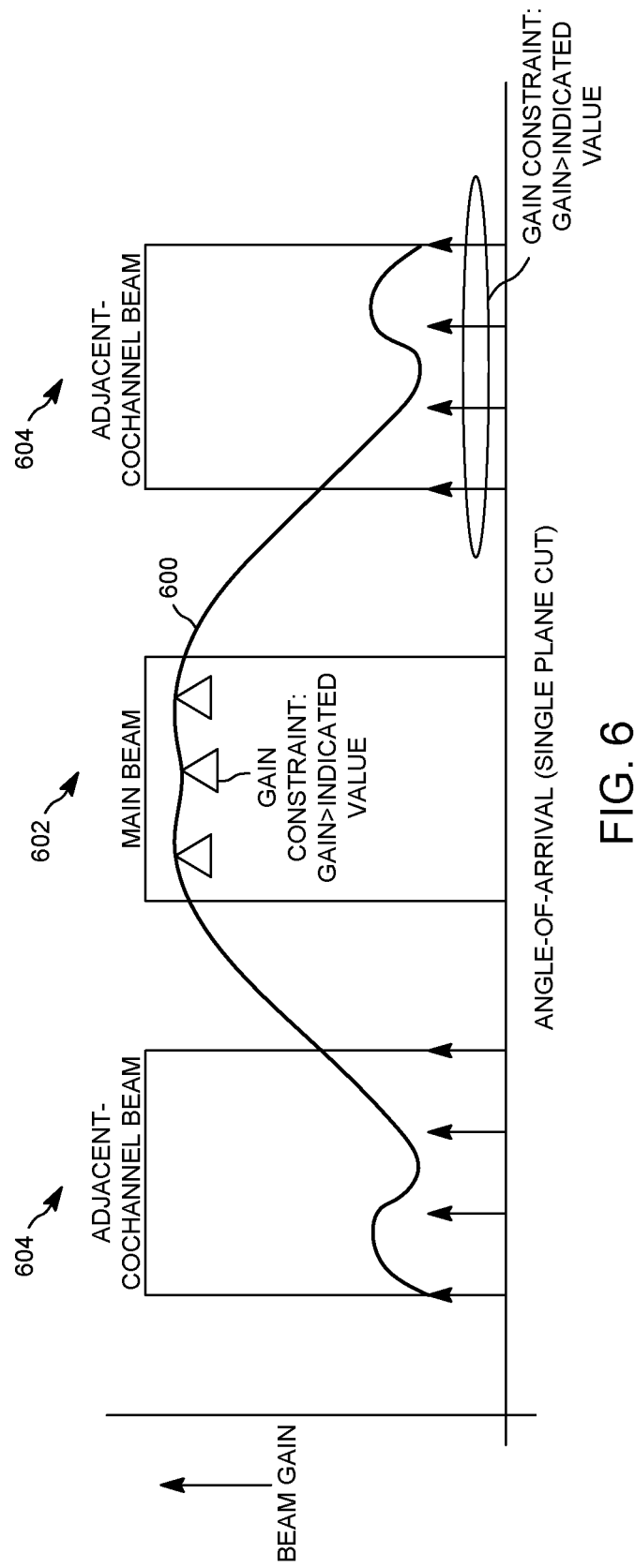
FIG. 6 illustrates a spot beam formed by prior art systems.

The following applies to both forward and return link beamforming. Once resource allocations are done, a customized beam is formed for each individual user with beam shape adaptive to cochannel UE distribution. The user beam can be formed with BF algorithm such as adaptive minimum mean square error (MMSE) based on user locations or user reference pilot signals. The pattern generation rule includes maximizing SINR toward the desired user with consideration of the actual, spatial distribution of all cochannel users, and each user gets a custom beam. With the methods described above, the adaptive beamformer is able to optimally utilize degrees of freedom offered by the antenna feed element array. FIG. 5 illustrates an example of how a user beam 500 is formed in principle under the illustrated user distribution scenario. In a conventional system, illustrated in FIG. 6, a fixed regional spot beam 600 is formed for all users in the main beam 602. The fixed spot beam 600 usually minimizes total received interference plus noise (I+N), subject to specified gain constraints for main beam 602 and locations of hypothetical users in cochannel-adjacent beams 604, as illustrated in FIG. 6. In contrast, as shown in FIG. 5, the customized user beam 500 maximizes SINR toward the desired user, adaptive to the actual, spatial distribution of all cochannel users. The fixed beam 600 of FIG. 6 would have disadvantages relative to the adaptive beam (user beam 500), such as gain degradation and adjacent cochannel beam interference for those users that are near the beam edge. The fixed beam 600 of FIG. 6 also dedicates the beamformer's degrees of freedom to optimize the beam shape for hypothetical desired and undesired users, which may not represent actual user distributions or actual interference environment.

2. Adaptive Beamforming Methods based on user location or waveform

A customized beam is formed for each individual user with beam shape adaptive to cochannel UE distribution, informed by the ARS. The adaptive user beamforming methods for both return link and forward link are described respectively in this section.

2.1 Return link method

Figure 7:
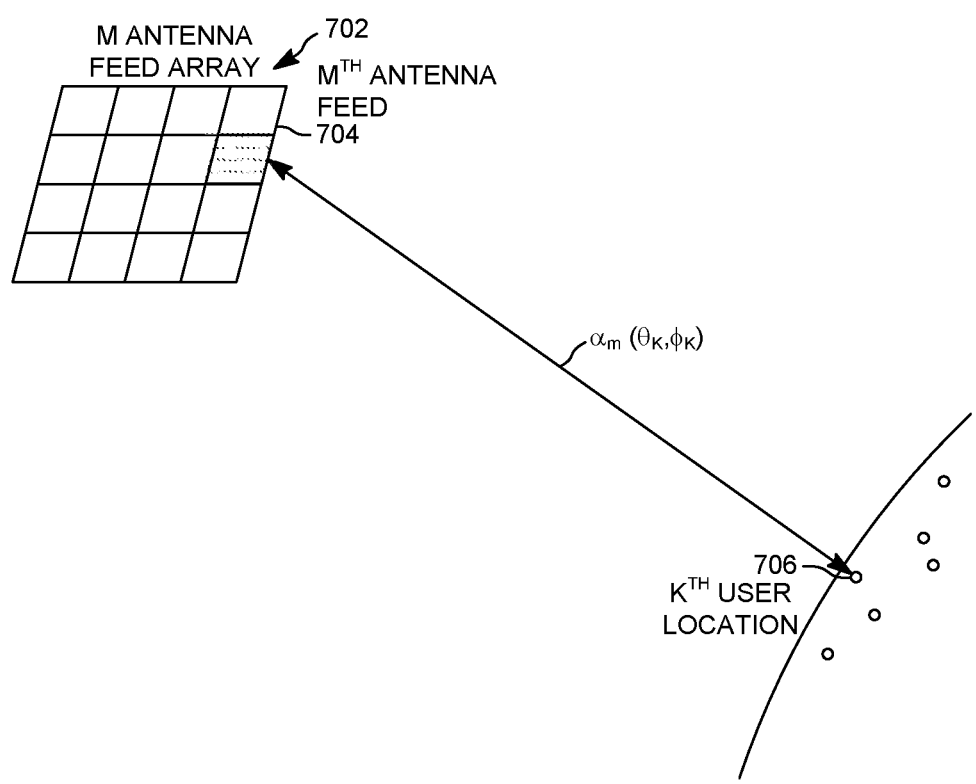
FIG. 7 illustrates aspects of the operation of the adaptive beamforming system of FIG. 1 according to some embodiments.

Assume that a satellite (not shown) has a 2-D antenna array 702 of M feed element elements (see FIG. 7). The $m^{th}$ feed element 704 has the complex (gain and phase) response of $\alpha_m(\theta_k, \varphi_k)$ at azimuth angle $\theta_k$ and elevation angle of $\varphi_k$ from the satellite point of view for the $k^{th}$ user location 706, as illustrated in FIG. 7. The array steering vector at the $k^{th}$ user location 706 is therefore defined by $$a(\theta_k,\varphi_k)=[\alpha_1(\theta_k,\varphi_k),\alpha_2(\theta_k,\varphi_k),\ldots \alpha_M(\theta_k,\varphi_k)]^T \in C^{M \times 1} \quad (1)$$

If K user signals $s_k(t)$, k=0,1, ... K−1, arrive from $(\theta_1,\varphi_1), \ldots,$ and $(\theta_K,\varphi_K)$ respectively, the array output vector can be expressed as a linear combination of the K incident waveforms and noise as below:

$$y(t) = \sum_{k=0}^{K-1} a(\theta_k, \varphi_k) s_k(t) + I(t) + n(t) \quad (2)$$
$$= As(t) + I(t) + n(t) \in C^{M \times 1}$$

where $$A=[\alpha(\theta_1,\varphi_1)\alpha(\theta_2,\varphi_2) \ldots \alpha(\theta_K,\varphi_K)] \quad (3)$$

is the array manifold that consists of K steering vectors, and $$s(t)=[s_1(t)s_2(t) \ldots s_K(t)]^T \quad (4)$$

is the vector of signal waveforms, and I(t) is the vector of cochannel interference that may include ancillary terrestrial component (ATC) interference, and n(t) is the additive complex Gaussian noise vector. In one embodiment, for a known location of the $k^{th}$ user at $(\theta_k, \varphi_k)$, to form a beam toward the $k^{th}$ user with the MMSE criterion, the beamformer may have the weights given by $$w=R_y^{-1}a(\theta_k,\varphi_k) \quad (5)$$

where $$R_y=E\{yy^H\} \quad (6)$$

is the antenna array co-variance matrix.

In another embodiment, for a known waveform of the $k^{th}$ user $s_k(t)$, to form a beam toward the $k^{th}$ user with the MMSE criterion, the beamformer may have the weights given by $$w=R_y^{-1}r_{ys} \quad (7)$$

where $$r_{ys}=E\{ys^*_k\} \quad (8)$$

is the correlation vector between the received vector and reference signal, which essentially is the estimated steering vector for the $k^{th}$ user.

2.2 Forward link method

Forward link beamforming is different from return link beamforming because the transmit antenna elements and receive antenna elements have different feed patterns (as a function of frequency) for an FDD system such as the one in satellite. Also, unlike the return link where the received array co-variance matrix $R_y$ can be estimated from the received array vector signal y(t), the forward link array co-variance matrix obviously does not exist. In the case of the forward link, a "virtual transmit array co-variance matrix" is introduced as a part of forward link beamforming method.

As the adaptive scheduler at S-BSS has all information about the locations of all the users, and power and bandwidth allocation for all the users, a "virtual transmit array co-variance matrix" can be constructed based on this information. In some embodiments, the "virtual transmit array co-variance matrix" can be constructed based on estimated spatial steering vectors. Assume that scheduler allocates total of K cochannel users whose carrier frequency has overlaid one another, and the K cochannel user locations are at $(\theta_1,\varphi_1(\theta_2,\varphi_2), \ldots,$ and $(\theta_K,\varphi_K)$ respectively. In addition, the corresponding allocated transmit power spectrum densities for the K cochannel users are $p_1, p_2 \ldots, p_K$ respectively. Now let's define a cochannel transmit array co-variance matrix as the following $$R_T=A_T(\theta,\varphi)PA_T^H(\theta,\varphi) \quad (9)$$

where $$A_T(\theta, \varphi) = [a_T(\theta_1, \varphi_1)\ a_T(\theta_2, \varphi_2) \ldots a_T(\theta_K, \varphi_K)] \quad (10)$$

$$= \begin{bmatrix} a_1(\theta_1, \varphi_1) & a_1(\theta_2, \varphi_2) & \ldots & a_1(\theta_K, \varphi_K) \\ a_2(\theta_1, \varphi_1) & a_2(\theta_2, \varphi_2) & \ldots & a_2(\theta_K, \varphi_K) \\ \vdots & \vdots & \ldots & \vdots \\ a_M(\theta_1, \varphi_1) & a_M(\theta_2, \varphi_2) & \ldots & a_M(\theta_K, \varphi_K) \end{bmatrix} \in C^{McK}$$

with $\alpha_m(\theta_k,\varphi_k)$ being the $m^{th}$ transmit feed element complex response at $\theta_k$ and $\varphi_k$ $$P = \mathrm{diag}\{p_1, p_2, \ldots, p_K\} = \begin{bmatrix} p_1 & 0 & \ldots & 0 \\ 0 & p_2 & 0 & 0 \\ \vdots & 0 & \ddots & \vdots \\ 0 & 0 & \ldots & p_K \end{bmatrix} \in R^{K \times K} \quad (11)$$

The matrix $R_T$ formed in Equation (9) is called as "virtual transmit array co-variance matrix". With $R_T$ being defined, the forward link beamforming weight for the $k^{th}$ user at location $(\theta_k, \varphi_k)$ is given by $$w = R_T^{-1} a_T(\theta_k, \varphi_k) \quad (12)$$

where $$a_T(\theta_k,\varphi_k) = [\alpha_1(\theta_k,\varphi_k), \alpha_2(\theta_k,\varphi_k) \ldots \alpha_M(\theta_k,\varphi_k)] \\ T \in C^{M \times 1} \quad (13)$$

is transmit steering vector toward the desired $k^{th}$ user.

2.3 Simulation Examples

Figure 8:
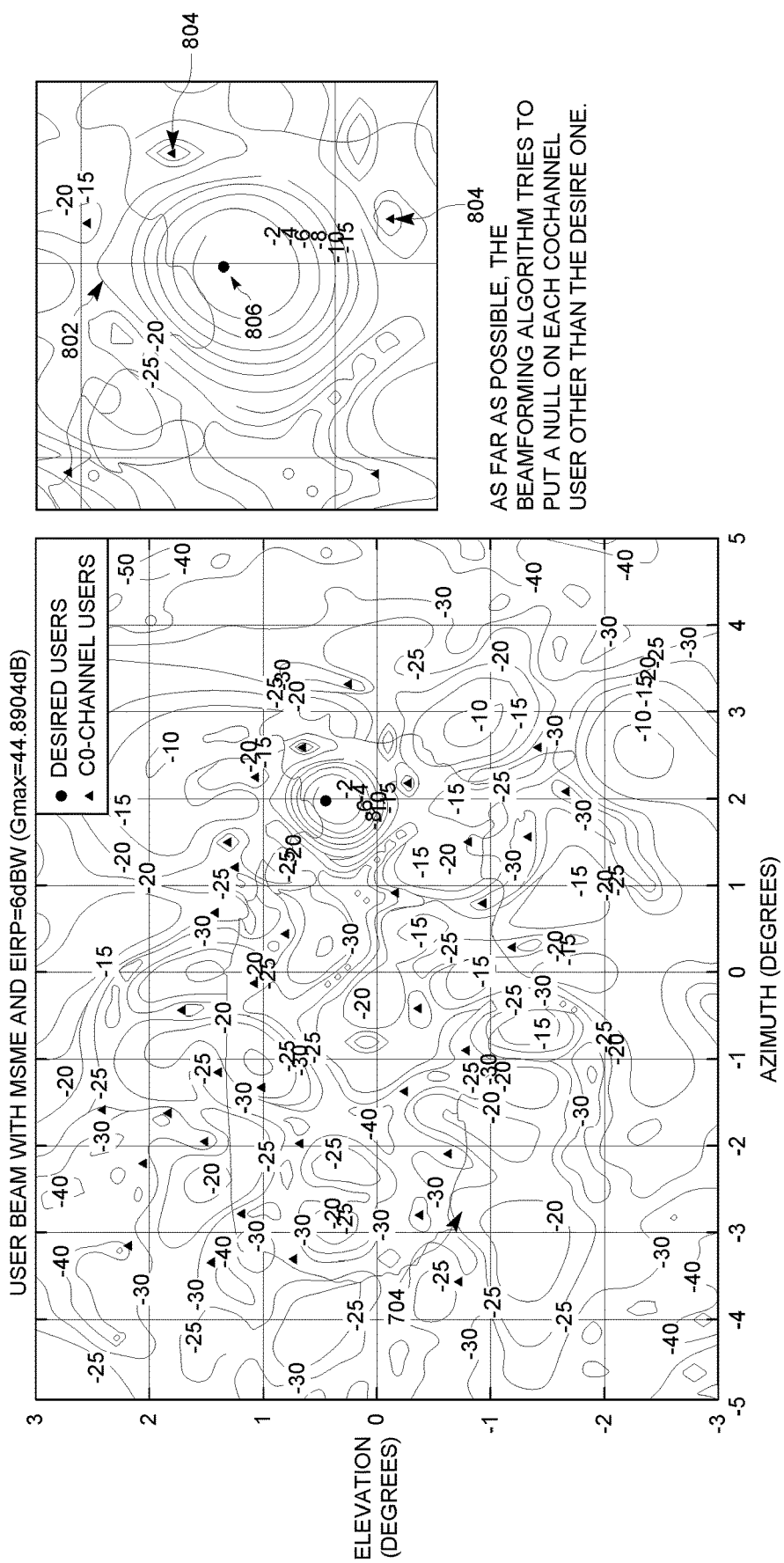
FIG. 8 illustrates an example of return link (RL) beam contours produced with the adaptive beamforming system of FIG. 1 according to some embodiments.
Figure 9:
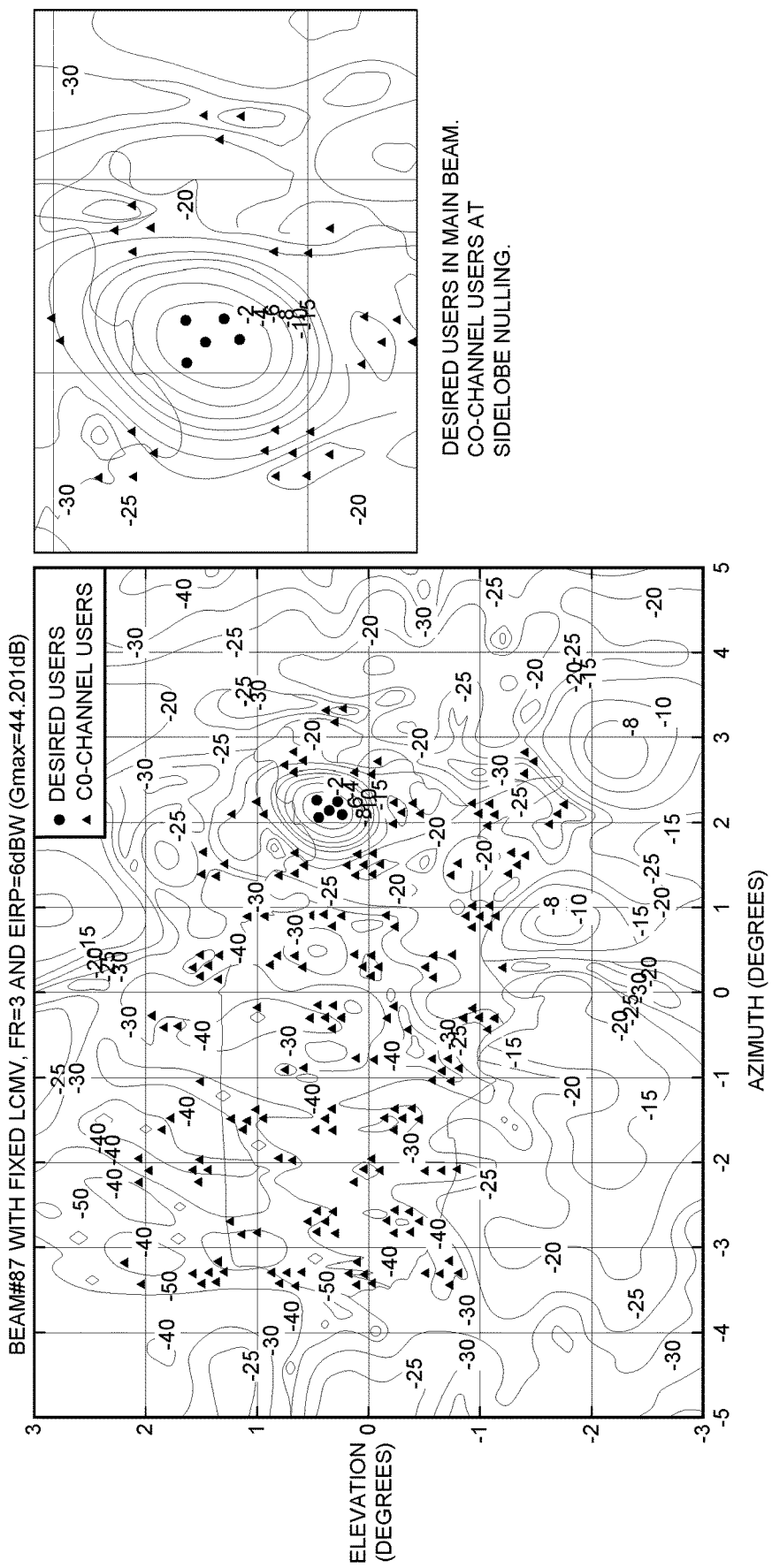
FIG. 9 illustrates an example of return link (RL) beam contours with a prior art beamforming system.

The performance of the new user beamforming system versus a conventional, fixed (non-adaptive), spot-beamforming system has been investigated with simulations of an L-band GEO satellite. The two systems were assumed to have the same number and spatial distribution of users. FIG. 8 illustrates an example of return link (RL) beam contours produced with embodiments of the user beamforming system presented herein, while FIG. 9 illustrates an example of return link (RL) beam contours with the conventional, fixed spot-beamforming system. As illustrated in FIG. 8, that the user beam 802 puts a null on each cochannel user 804 while trying to maximize the gain to the desired user 806.

Figure 10:
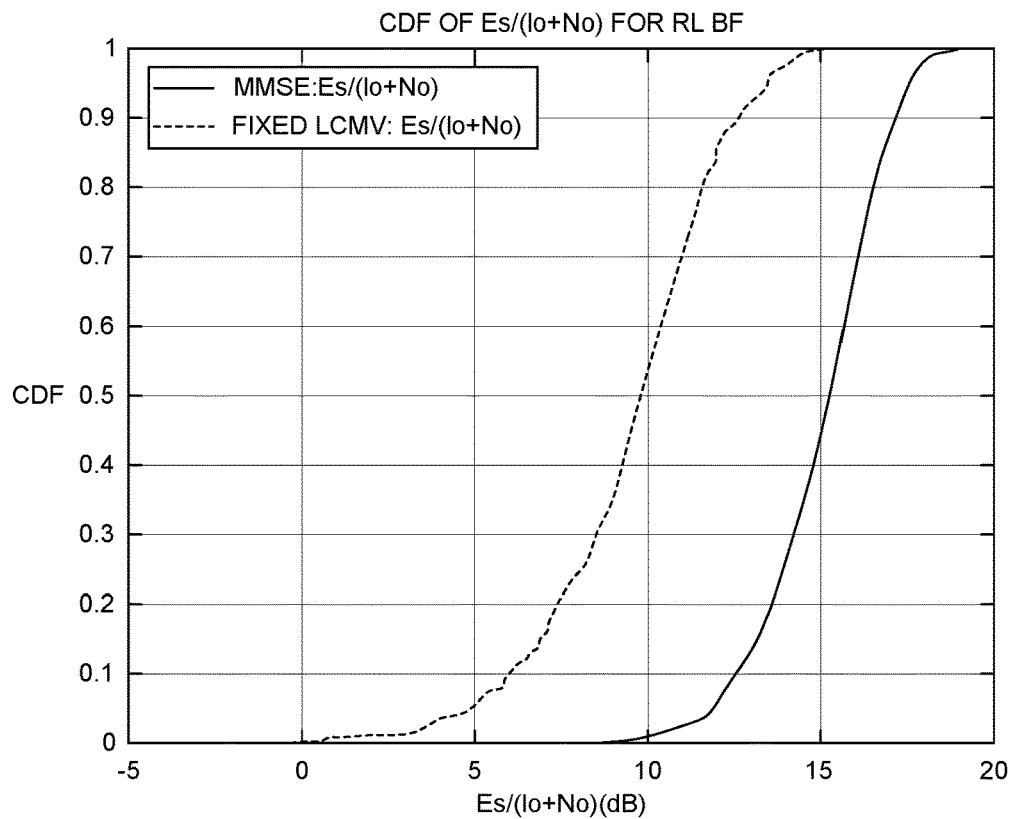
FIG. 10 is a chart illustrating the performance of the adaptive beamforming system of FIG. 1 according to some embodiments.
Figure 11:
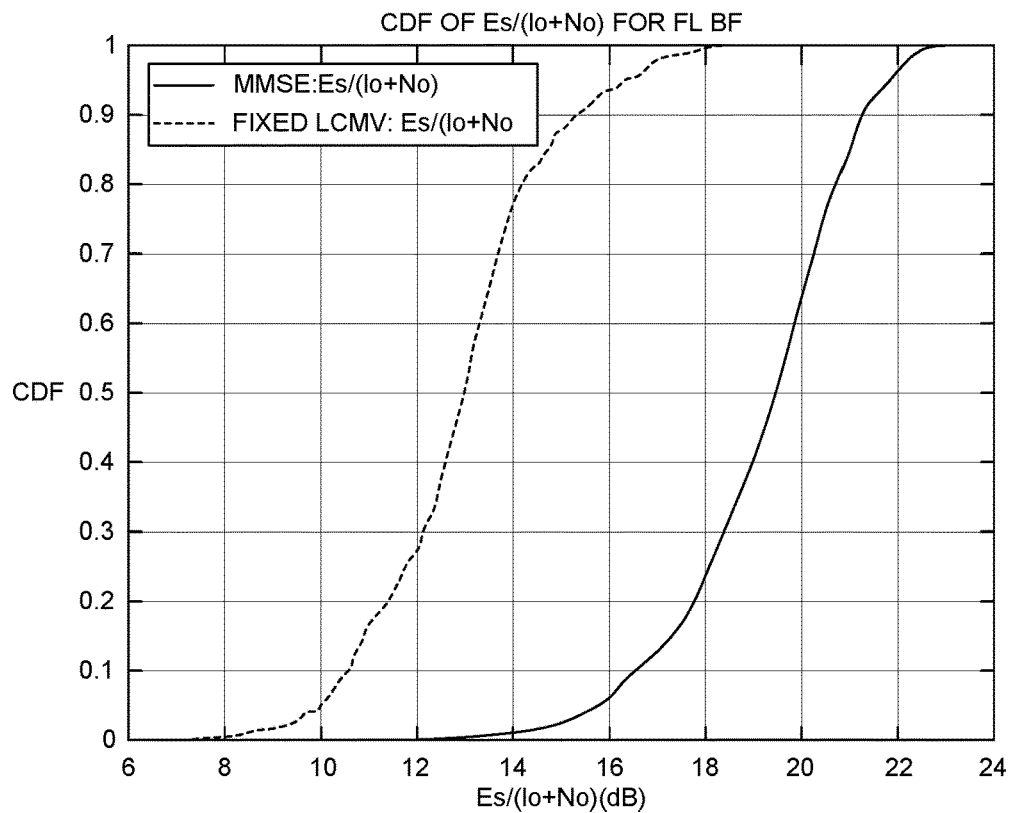
FIG. 11 is a chart illustrating the performance of the adaptive beamforming system of FIG. 1 according to some embodiments.

To quantify the performance, Monte-Carlo simulations were conducted to provide the CDF (cumulative distribution function) of $E_s/(I_o+N_o)$ among all users for the two systems (adaptive and fixed). MMSE (Minimum Mean Squared Error) was the optimization criterion used for adaptive beamforming and LCMV (Linearly Constrained Minimum Variance) was the optimization criterion used for designing the fixed beams. The simulations show that the new system offers significantly better performance than the legacy system for both return link (RL) and forward link (FL), as shown in FIG. 10 and FIG. 11, respectively. The improvement of user's SINR leads to improvement of the system capacity (measured as network-wide aggregate throughput). FIG. 15 (chart 1500) further illustrates the performance improvements of a user beam system over a conventional fixed spot beam system.

Figure 12:
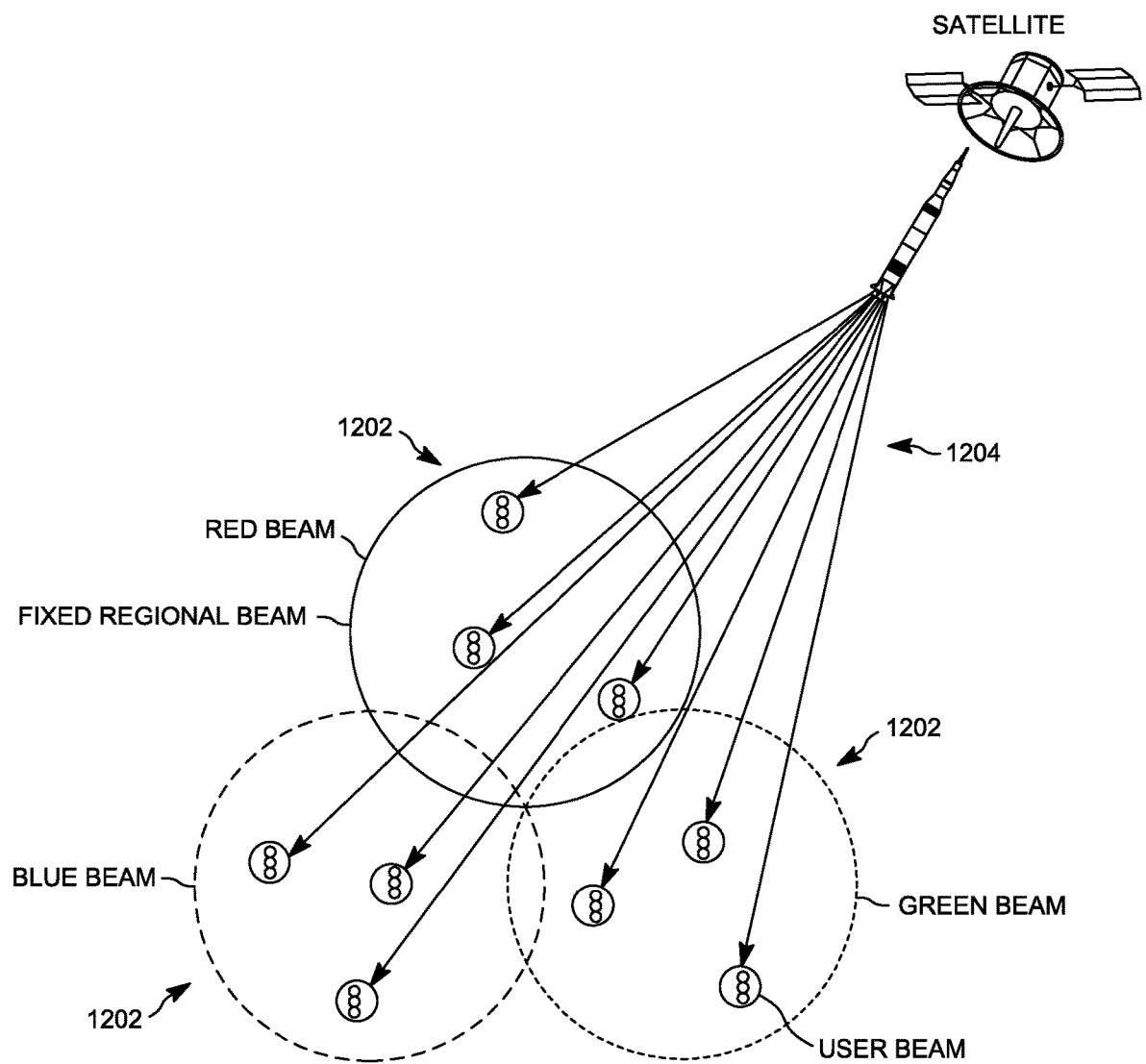
FIG. 12 illustrates aspects of the operation of the adaptive beamforming system of FIG. 1 according to some embodiments.

3. Bootstrapping of a UE in an individual-user optimized adaptive beamforming system When a UE tries to initially join the network, there is no user beam. This section presents a method to enable a UE to initially join the network and establish a user beam. We first introduce the concepts of quiescent state beams and steady state beams. The quiescent state beams are the ones used by the S-BSS before a user beam is established to broadcast synchronization signals, reference signals, and system information (SI) that provides essential information for the UE to operate in the network. The steady state beams are the adaptively formed, individual-user-optimized beams generated by the S-BSS in the connected state. We refer to the latter as "user beams." The user beam shape adapts to the distribution of the ensemble of all cochannel UEs in the footprint of the satellite, while attempting to maximize the SNIR of the desired UE. FIG. 12 illustrates the S-BSS new beam concept and definitions. The fixed regional beams 1202 are used in the quiescent state, and the user beams 1204 are used in the steady state (i.e., connected state). The fixed regional beams 1202 may initially serve the users using a traditional, 3-color frequency reuse, illustrated as an example in FIG. 12. The use of a frequency reuse factor of 3 is cited as an example and is neither essential nor prescriptive. The fixed regional beam may be optimized to achieve a desired shape, such as minimum in-beam gain and minimum out-of-beam rejection at selected points in the beam's look angle, using algorithms such as the fixed LCMV. The beams could be the actual beams for a legacy system.

Figure 13:
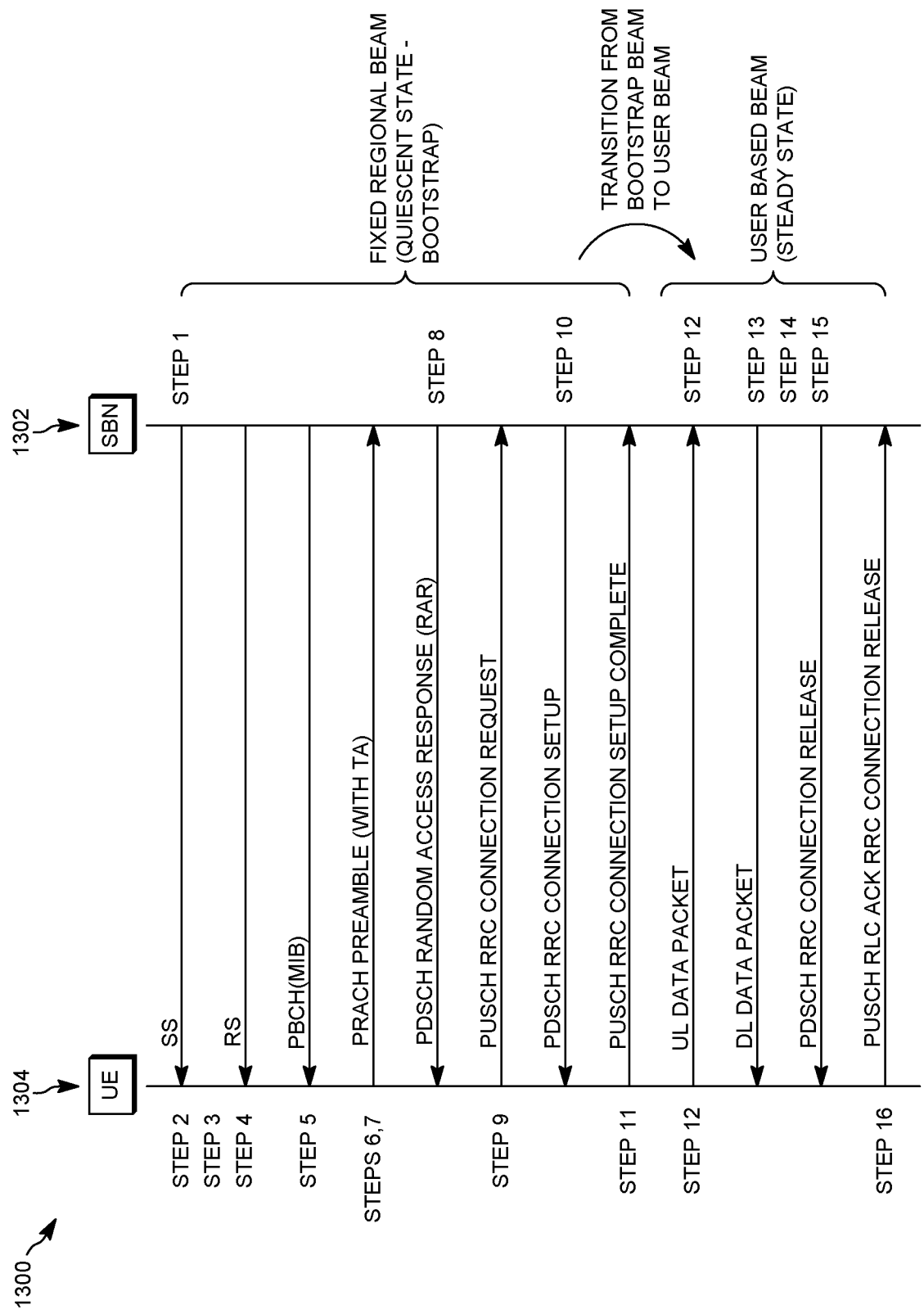
FIG. 13 is flow diagram illustrating an adaptive user beam startup procedure, according to some embodiments.

The bootstrap procedure for S-BSS system with adaptive user beams may be air interface dependent. FIG. 13 illustrates one example embodiment of an adaptive user beam startup procedure 1300, described in terms of an LTE satellite air interface for a space-based network (SBN) 1302 and a user equipment (UE) 1304.

Step 1—Fixed regional DL beams broadcast system information (SI), which is common to all beams, plus synchronization signals (SS) and reference signals (RS), which are unique to each of the fixed beams, as sent to the UE 1304.

Step 2—The UE 1304 scans all the frequency bands supported by the UE 1304, and finds the strongest beam as the beam selection candidate.

Step 3—The UE 1304 searches for SS to perform time and frequency synchronizations.

Step 4—The UE 1304 synchronizes to the SS to perform beam identification and initial frame synchronization.

Step 5—The UE 1304 performs system information (SI) acquisition on downlink physical broadcast channel (PBCH), which may include system bandwidth, PRACH (physical random access channel) configuration information.

Step 6—The UE 1304 estimates the uplink timing advance by using its GPS location information and the Satellite location information, which improves overall system latency and efficiency relative to present 3GPP methods. However, a suitable adaptation of the latter may also be used.

Step 7—The UE 1304 performs RS based reference signal received power (RSRP) measurement and send a PRACH preamble with appropriate PRACH power level to request access to the SBN 1302 with the estimated timing advance.

Step 8—A Satellite Base Station Subsystem, through the corresponding Fixed regional UL beam, detects PRACH preamble and send back random access response (RAR) which may contain UL timing command (if any timing adjustment is needed) and scheduling information pointing to radio resources that the UE 1304 can use to transmit a request to connect.

Step 9—The UE 1304 transmits a request to connect which contains its identity and location information as part of a Radio Resource Control (RRC) layer message.

Step 10—The SBN 1302 transmits a connection setup/resume message and contention resolution data that resolves any contention due to possible multiple UEs transmitting the same preamble in Step 7.

Step 11—The UE 1304 replies with a connection setup/resume complete message to terminate the random access procedure and complete the transition to connected state.

Step 12—The SBN 1302 forms a user UL beam (receive beam) for the UE 1304 based on the UE locations or the UE reference pilot signal and network radio resource scheduling information, and switches the receive beam from the fixed UL regional beam to the user-based UL beam for the UL data packet.

Step 13—The SBN 1302 forms a user DL beam (transmit beam) for the UE 1304 based on the UE locations or the UE reference pilot and network radio resource scheduling information, and switches the transmit beam from the fixed DL regional beam to the user-based DL beam for the DL data packet.

Step 14—The SBN 1302 completes DL/UL data packet in the connected state.

Step 15—The SBN 1302 transmits RRC connection release on PDSCH.

Step 16—UE 1304 responds to acknowledge RRC connection release on PUSCH RLC.

4. Mobility Management for User Based Beamforming Space-based Network (SBN)

In idle mode, when the MME (mobile management entity) in the core network needs to page a UE, it informs the involved user beam entity in the S-BSS, so that the paging can be transmitted through the user beam. In that case, the MME has been keeping UE history information since an earlier session in the user beam. This assumes that the device is stationary since its last access to the network. However, if the device moves around when in idle mode, the MME may not have adequate information about the coverage situation changes. In this case, some level of MO (mobile originated) traffic may be used to assist the MME in keep track of the UE, and thus to improve the DL reachability for the device. For example, the network can track the device by using device-triggered location updates.

In connected mode, a UE keeps updating its location information so that the SBN network can update the user beam weight adaptively to all cochannel user situations. Meanwhile the SBN can determine whether the UE is still in the same "regional beam zone" from the latest location update. If the UE is moving out of the current zone and into a neighboring "regional beam zone", the network starts the handover process by informing the UE new frequency and/or time scheduling information and updating the user beam with new beam weight accordingly since the beam weight set is dependent on the frequency allocation. The handover to the new user beam should be seamless to the user as the user beam still maximizes SINR toward the same desired user, only adaptively to the new cochannel user situations.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

Various features and advantages of some embodiments are set forth in the following claims.

What is claimed is:

1. A method of beamforming for a satellite system, the method comprising:
   during startup of the satellite system, sharing a fixed beam among a plurality of user equipment;
   generating, with a beamformer, a customized user beam for a user equipment of the plurality of user equipment, the user equipment having a location and transmitting a known pilot signal; and
   subsequently transitioning from the fixed beam to the customized user beam.

2. The method of claim 1, wherein the customized user beam is generated based on knowledge of the location of the user equipment.

3. The method of claim 2, wherein information about the location of the user equipment is transferred from the user equipment to the beamformer.

4. The method of claim 1, wherein the customized beam is generated based on knowledge of the pilot signal transmitted by the user equipment.

5. The method of claim 1, wherein generating a customized user beam is performed using a ground-based beamformer.

6. The method of claim 5, wherein the ground-based beamformer is integrated into a satellite base station subsystem.

7. The method of claim 1, wherein generating a customized user beam includes generating a customized user beam for a return link of the satellite system.

8. The method of claim 7, wherein generating a customized user beam for a return link includes maximizing a signal to noise and interference ratio of a signal received from the individual user equipment.

9. The method of claim 7, wherein the beamformer is executed by a satellite base station subsystem, and
   generating a customized user beam for a return link includes
   analyzing signals received by an antenna array carried on a satellite of the satellite system, and
   maximizing the signal to noise and interference ratio of the signal received from the individual user equipment.

10. The method of claim 9, wherein analyzing signals received by an antenna array carried on a satellite of the satellite system includes analyzing complex baseband signals received from individual elements of the antenna array.

11. The method of claim 10, further comprising receiving the complex baseband signals through a ground-based beamformer configured to be operated in a pass-through mode.

12. The method of claim 1, wherein generating a customized user beam includes generating a customized user beam for a forward link that includes
   constructing a virtual transmit array co-variance matrix based on the locations, power, and bandwidth allocations of all active users, and
   forming a user beam that maximizes the gain towards the desired user while minimizing the gains towards all other active co-channel users.

13. The method of claim 12, further comprising transmitting, with a satellite base station subsystem, complex baseband signals to individual elements of an antenna array on a satellite.

14. The method of claim 13, further comprising passing the complex baseband signals through a ground-based beamformer configured to be operated in a pass-through mode.

15. The method of claim 12, further comprising:
   for each of a plurality of user beams supported by the forward link, providing power to the user beam only where active user equipment is present in the user beam.

16. The method of claim 15, wherein providing power to the user beam includes providing power proportional to the quantity of active user equipment present in the user beam.

17. The method of claim 16, wherein the plurality of user beams is included in a beam zone and providing power to the user beam includes allocating substantially the same amount of power to each active user equipment present in the beam zone.

18. The method of claim 15, wherein providing power to the user beam includes allocating power to the active user equipment based on at least one selected from the group consisting of a quality of service and a link margin requirement.

19. The method of claim 1, wherein generating a customized user beam includes generating a customized user beam for a forward link that includes
constructing a virtual transmit array co-variance matrix based on the estimated spatial steering vectors, power, and bandwidth allocations of all active users, and
forming a user beam that maximizes the gain towards the desired user while minimizing the gains towards all other active co-channel users.

20. The method of claim 1, wherein the satellite system is an FDD system.

21. The method of claim 1, wherein
the satellite system is a TDD system; and
generating a customized user beam includes substantially reusing a plurality of return link weights in a forward link.

22. The method of claim 1, further comprising:
determining, for each of a plurality of user equipment sharing a common frequency, a spatial separation; and
when the spatial separation is less than a threshold value, generating a plurality of customized user beams sharing a common frequency using a multiplexing method.

23. The method of claim 22, wherein the threshold value is based on at least one characteristic of an antenna array for the satellite system.

24. The method of claim 22, wherein the multiplexing method includes at least one selected from the group consisting of orthogonal frequency division multiplexing, time division multiplexing, and code division multiplexing.

25. The method of claim 1, further comprising:
while operating in an idle mode, paging the user equipment through the customized user beam to assist a mobility management entity of the satellite system in tracking the user equipment.

26. The method of claim 1, further comprising:
while operating in a connected mode, receiving, from the user equipment, an update to the location information of the user equipment; and
updating a user beam weight adaptively based on the update.

27. The method of claim 26, further comprising:
determining, with a space-based network, a regional beam zone for the user equipment;
during a handoff process, determining, based on the regional beam zone, at least one selected from the group consisting of a new user equipment frequency and a time scheduling information; and
updating the customized user beam with a new beam weight based on the regional beam zone.

28. The method of claim 1, further comprising:
transparently coupling signals to and from a satellite antenna array to a satellite base station subsystem without passing through an intermediate, separate beamformer.

29. The method of claim 28, wherein the satellite base station subsystem includes an adaptive resource scheduler responsive to the radio frequency characteristics of signals received by the satellite base station subsystem.

30. An adaptive beamforming system, the system comprising:
an electronic processor communicatively coupled to a satellite system and configured to
during startup of the satellite system, share a fixed beam among a plurality of user equipment
generate, with a beamformer, a customized user beam for the user equipment, the user equipment having a location and transmitting a known pilot signal; and
subsequently transition from the fixed beam to the customized user beam.

31. The system of claim 30, wherein the electronic processor is configured to generate the customized user beam based on knowledge of a location of the user equipment.

32. The system of claim 31, wherein the electronic processor is configured to receive the knowledge of the location of the user equipment from the user equipment.

33. The system of claim 30, wherein the electronic processor is configured to generate the customized user beam based on knowledge of the known pilot signal transmitted by the user equipment.

34. The system of claim 30, wherein the beamformer is a ground-based beamformer.

35. The system of claim 34, wherein the electronic processor is configured to generate a customized user beam with a ground-based beamformer, and wherein the generation of the customized beam is integrated into a satellite base station subsystem.

36. The system of claim 30, wherein the electronic processor is configured to generate the customized user beam for a return link of the satellite system.

37. The system of claim 36, wherein the electronic processor is configured to:
generate the customized user beam by maximizing a signal to noise and interference ratio of a signal received from the individual user equipment.

38. The system of claim 36, wherein the electronic processor is configured to:
execute the beamformer on a satellite base station subsystem, and
generate a customized user beam for a return link by
analyzing signals received by an antenna array carried on a satellite of the satellite system, and
maximizing the signal to noise and interference ratio of the signal received from the individual user equipment.

39. The system of claim 38, wherein the electronic processor is configured to analyze signals received by an antenna array carried on a satellite of the satellite system by analyzing complex baseband signals received from individual elements of the antenna array.

40. The system of claim 39, further the electronic processor is configured to receive the complex baseband signals through a ground-based beamformer configured to be operated in a pass-through mode.

41. The system of claim 30, wherein the electronic processor is configured to generate a customized user beam by generating a customized user beam for a forward link that includes
constructing a virtual transmit array co-variance matrix based on the locations, power, and bandwidth allocations of all active users, and
forming a user beam that maximizes the gain towards the desired user while minimizing the gains towards all other active co-channel users.

42. The system of claim 41, wherein the electronic processor is configured to transmit, with a satellite base station subsystem, complex baseband signals to individual elements of an antenna array on a satellite.

43. The system of claim 42, wherein the electronic processor is configured to pass the complex baseband signals through a ground-based beamformer configured to be operated in a pass-through mode.

44. The system of claim 41, wherein the electronic processor is configured to:

for each of a plurality of user beams supported by the forward link, provide power to the user beam only where active user equipment is present in the user beam.

45. The system of claim 44, wherein the electronic processor is configured to provide power to the user beam by providing power proportional to the quantity of active user equipment present in the user beam.

46. The system of claim 45, wherein the plurality of user beams are included in a beam zone and the electronic processor is configured to provide power to the user beam by allocating substantially the same amount of power to each active user equipment present in the beam zone.

47. The system of claim 44, wherein the electronic processor is configured to provide power to the user beam by allocating power to the active user equipment based on at least one selected from the group consisting of a quality of service and a link margin requirement.

48. The system of claim 30, wherein the electronic processor is configured to generate a customized user beam by generating a customized user beam for a forward link that includes
    constructing a virtual transmit array co-variance matrix based on the estimated spatial steering vectors, power, and bandwidth allocations of all active users, and
    forming a user beam that maximizes the gain towards the desired user while minimizing the gains towards all other active co-channel users.

49. The system of claim 30, wherein the satellite system is an FDD system.

50. The system of claim 30, wherein
the satellite system is a TDD system; and
the electronic processor is configured to generate a customized user beam by substantially reusing a plurality of return link weights in a forward link.

51. The system of claim 30, wherein the electronic processor is configured to:
    determine, for each of a plurality of user equipment sharing a common frequency, a spatial separation; and
    when the spatial separation is less than a threshold value, generate a plurality of customized user beams sharing a common frequency using a multiplexing method.

52. The system of claim 51, wherein the threshold value is based on at least one characteristic of an antenna array for the satellite system.

53. The system of claim 51, wherein the multiplexing method includes at least one selected from the group consisting of orthogonal frequency division multiplexing, time division multiplexing, and code division multiplexing.

54. The system of claim 30, wherein the electronic processor is configured to:
    while operating in an idle mode, page the user equipment through the customized user beam to assist a mobility management entity of the satellite system in tracking the user equipment.

55. The system of claim 30, wherein the electronic processor is configured to:
    while operating in a connected mode, receive, from the user equipment, an update to the location information of the user equipment; and
    update a user beam weight adaptively based on the update.

56. The system of claim 55, wherein the electronic processor is configured to:
    determine, for a space-based network, a regional beam zone for the user equipment;
    during a handoff process, determine, based on the regional beam zone, at least one selected from the group consisting of a new user equipment frequency and a time scheduling information; and
    update the customized user beam with a new beam weight based on the regional beam zone.

57. The system of claim 30, wherein the electronic processor is configured to:
    transparently couple signals to and from a satellite antenna array to a satellite base station subsystem without passing through an intermediate, separate beamformer.

58. The system of claim 57, wherein the satellite base station subsystem includes an adaptive resource scheduler responsive to the radio frequency characteristics of signals received by the satellite base station subsystem.

\* \* \* \* \*